No. 873,548.　　　　　　　　　　　　　PATENTED DEC. 10, 1907.
W. A. HIGGS & M. S. HAMILTON.
COTTON CHOPPER AND CULTIVATOR.
APPLICATION FILED JAN. 23, 1907.
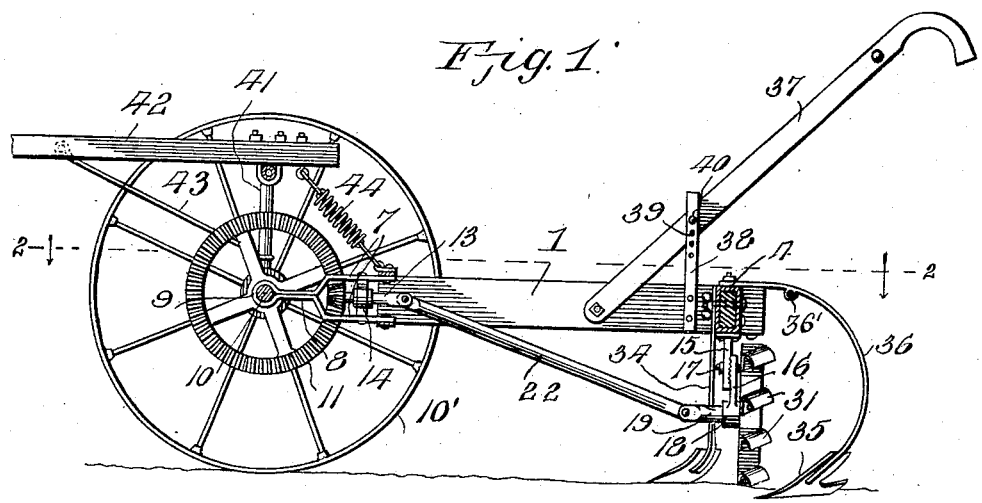
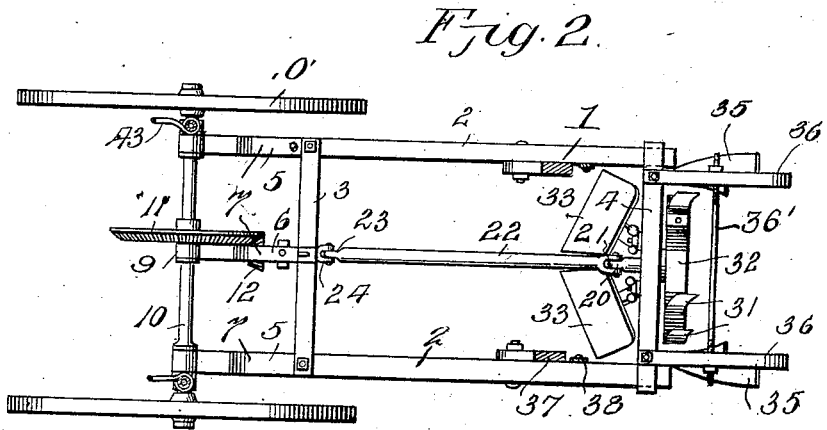
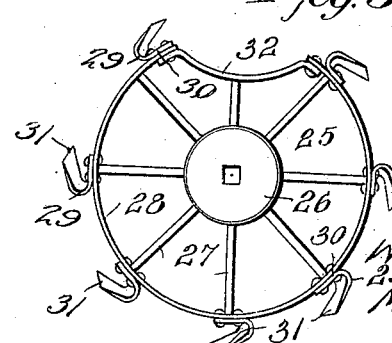
Witnesses
Frank Hough
D. W. Gould.
Inventors
William A. Higgs,
Morgan S. Hamilton,
By Victor J. Evans
Attorney

UNITED STATES PATENT OFFICE.

WILLIAM A. HIGGS AND MORGAN S. HAMILTON, OF DAVIS, TEXAS.

COTTON CHOPPER AND CULTIVATOR.

No. 873,548.      Specification of Letters Patent.      Patented Dec. 10, 1907.

Application filed January 23, 1907. Serial No. 353,724.

*To all whom it may concern:*

Be it known that we, WILLIAM A. HIGGS and MORGAN S. HAMILTON, citizens of the United States, residing at Davis, in the county of Lamar and State of Texas, have invented new and useful Improvements in Cotton Choppers and Cultivators, of which the following is a specification.

The invention relates to an improvement in cotton choppers and cultivators, in the use of which the row of plants is effectively thinned and cultivated.

The main object of the present invention is the production of a chopper and cultivator provided with a chopping wheel carrying a series of blades, the periphery of the wheel being provided with the blades at uniform intervals with the exception of a portion of said periphery which is free of chopping blades and shaped to avoid interfering with the plant to which this particular portion of the wheel is presented, thereby the series of plants at regular spaced intervals throughout the length of the row will remain standing after the operation of the machine.

The invention will be described in the following specification, reference being had particularly to the accompanying drawings, in which:—

Figure 1 is a central vertical section through a machine constructed in accordance with my invention. Fig. 2 is a section on line 2—2 of Fig. 1, the ground wheels and driving gear being shown in plan. Fig. 3 is a side elevation of the top of the wheel. Fig. 4 is a perspective of the upper portion of one of the bars for supporting the cutting blades.

Referring particularly to the drawings, wherein similar reference numerals indicate like parts throughout the several views, my improved cultivator and chopper comprises a frame 1 including side bars 2 connected at their forward ends by upper and lower cross bars 3 and at their rear ends by a cross bar 4, the side bars preferably extending a short distance in rear of the rear cross bar 4. The cross bar 4 is bound with strips of iron, which are projected at the ends beyond the bar in the form of loops 4'. These loops receive the side bars, the latter being secured in the loops through the medium of pivot pins, as shown.

The main frame is provided at its forward end with side brackets 5 and a central bracket 6, the latter being secured to the forward cross bars 3 and the former to the forward edges of the side bars 2. The forward ends of the side bars 2 are pivotally secured to the brackets 5 through the medium of suitable pivot pins, also providing a free side movement of the entire frame, as will be evident. Each of the brackets 5 and 6 are of identical construction comprising a metallic strip shaped to provide spaced arms 7 adjacent their connection with the main frame and projected from the forward edge of said arms in contact, as at 8, being formed at their relatively forward ends with an eye or collar 9 to receive the axle 10 on the ends of which are mounted the ground wheels 10'. The main frame is thus movably connected to the axle so as to permit the independent elevation of the rear end of said frame when desired.

The axle pin is provided immediately adjacent the central bracket 6 with a bevel gear 11, designed to mesh with a bevel pinion 12 secured upon the end of a shaft 13 supported in a bearing 14 secured between the spaced arms 7 of the central bracket.

A hanger bar 15 depends from the under side of the rear cross bar 4, said bar being serrated or roughened on the rear face and formed with an elongated slot. A supporting bar 16 is arranged for adjustable coöperation with the hanger bar 15, being serrated on the forward face and formed with an opening to permit the passage of a bolt 17, which in the operative relation of the parts is passed through the elongated slot in the hanger bar 15, the nut serving to bind the bars 15 and 16 together in desired adjusted relation. The lower end of the supporting bar 16 is formed with a collar 18 to provide a bearing for a shaft 19, the forward end of which shaft is reduced to provide an ear 20 to fit between spaced ears 21 formed on the rear end of an operating shaft 22, the forward end of the shaft 22 being reduced to provide an ear 23 fitting between and pivotally connected to spaced ears 24 on the rear end of the pinion shaft 13. The pivotal connection of the operating shaft 22 with the shafts 13 and 19 provides for revolving the shaft 19 under the influence of the bevel pinion without particular regard to the position of the shaft 19 relative to the shaft 13, thereby insuring the desired operation of the shaft 19 in all possible adjustments of the supporting bar 16 relative to the hanger bar 15. The rear end of the shaft 19 is provided with a skeleton chopping wheel 25 preferably comprising a disk hub 26 secured upon the shaft, a series of radiating spokes 27 and a rim 28.

Secured upon the rim of the wheel 25 are chopping blades 29, each of which comprise a base section 30 bolted or otherwise secured to the rim and a cutting section 31 projecting approximately tangential to the periphery of the wheel and twisted relative to the base portion so as to arrange the free or cutting edge of the section 31 at an incline to a line transverse to the periphery of the wheel. The periphery of the wheel is interrupted for a portion of its length, said interrupted portion being bridged by a connecting strip 32 of segmental form and curved oppositely to the wheel periphery, thereby providing at this point in the wheel an open space relieved of chopping blades and also of the wheel rim.

Directly in advance of the chopping wheel and on opposite sides of the shaft 19 are arranged cutting blades 33, having their shear edges inclined from their innermost points inwardly and outwardly relative to the longitudinal center of the main frame. These blades are connected to the lower end of bars 34, which at their upper ends are secured to cross bar 4, preferably through the medium of eye bolts so arranged as to permit the vertical adjustment of the bars 34 as desired. The blades 33 are approximately of spade form and serve as a cutting medium for the weeds or other growth alongside the row of plants. The cross bar 4, near each end, is provided with a cultivating member including a cultivator blade 35 carried on the lower end of a curved bar 36, the upper end of which rests upon and is secured to the upper surface of the bar. The cultivating members are pivotally secured to the rear cross bar 4 and are connected by an adjusting bar 36', arranged for threaded connection with the bars 36, or secured thereto by nuts as desired, whereby the cultivating members may be adjustably spaced as desired.

Handles 37 are pivotally connected at their lower ends to the relatively inner surfaces of the side bars, and are arranged for adjustment as to the height of the hand grasping ends through connection with uprights 38 secured to the side bar in rear of the handle pivot and formed with a series of alined openings 39 for the reception of a pin 40 adapted to pass through an opening in the handle bar. The bars may be thus adjusted to dispose their free ends at any desired height, as will be evident. An inverted U-shaped supporting bar 41 forms part of the arched axle 10, the upper portion of said bar supporting the draft beam 42 further supported through brace bars 43 leading to the axle. The rear end of the draft beam is connected with the central portion of the forward cross bar 3 through the medium of a coil spring 44, tending in a measure to counterbalance the weight of the main frame and providing for a more convenient manual control of the position of said frame relative to the drawing.

In use the combined chopper and cultivator is drawn longitudinally of the row of plants, with the cutting blades 33 disposed on opposite sides of the row. The blades operate to cut the weeds and loosen the soil on each side of the row, while the chopping wheel, revolving at a comparatively high speed, tends to effectively chop or cut the plants during the travel of the implement. The chopping blades 29 are so arranged as to insure their coöperation with all of the plants in the row except those with which the depression 32 in the wheel registers. These plants are unaffected by the chopping blades and, therefore, remain standing. The row of plants is thus effectively thinned, it being understood that the size of the chopping wheel and the relative arrangement of the chopping blades and depression 32 is such as to leave that proportion of the plants standing which may be desirable. As the implement advances the shovels 35 in rear of the chopping wheel loosen the soil and direct the same onto the plants, thus completing the cultivation.

The machine is simple in construction and the pivotal supporting of the main frame on the axle provides for readily lifting the frame through operation of lifting the handles when desired to prevent operation of the cultivating members or chopping wheel. Through connection of the hanger bar 15 and supporting bar 16 the chopper wheel may be readily adjusted to control the effective operation of the chopping blades.

Having thus described the invention what is claimed as new, is:—

1. A cotton chopper comprising a main axle, ground wheels mounted thereon, a main frame movably supported on the axle, a chopping wheel supported on the main frame, and means for driving said wheel in the movement of the axle, said wheel being formed in its periphery with a depression, and a series of chopping blades regularly spaced about the periphery of the wheel with the exception of the depressed portion.

2. A cotton chopper comprising a main axle, ground wheels mounted thereon, a main frame movably supported on the axle, a chopping wheel adjustably supported on the main frame, means for driving said wheel in the movement of the axle, said wheel being formed in its periphery with a depression, and a series of chopping blades regularly spaced about the periphery of the wheel with the exception of the depressed portion.

3. A cotton chopper comprising a main axle, ground wheels mounted thereon, a main frame pivotally mounted on the axle and extending wholly in rear thereof, a chopping wheel adjustably secured to the main frame, a bevel gear fixed on the axle, a shaft carried by the main frame, a pinion on said shaft to engage the gear, a chopping wheel shaft adjustably supported on the main frame, a chopping wheel carried by said shaft, and an operating shaft movably connected with the pinion shaft and with the chopping wheel shaft.

In testimony whereof, we affix our signatures in presence of two witnesses.

WILLIAM A. HIGGS.
MORGAN S. HAMILTON.

Witnesses:
J. M. EARLY,
J. C. EARLY.